US009010088B2

(12) United States Patent
Ishikawa et al.

(10) Patent No.: US 9,010,088 B2
(45) Date of Patent: Apr. 21, 2015

(54) WORKING MACHINE

(75) Inventors: Kouji Ishikawa, Tsuchiura (JP); Hidetoshi Satake, Tsuchiura (JP); Shinji Nishikawa, Tsuchiura (JP); Takatoshi Ooki, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 133 days.

(21) Appl. No.: 13/819,549

(22) PCT Filed: Aug. 24, 2011

(86) PCT No.: PCT/JP2011/069057
§ 371 (c)(1),
(2), (4) Date: May 6, 2013

(87) PCT Pub. No.: WO2012/029606
PCT Pub. Date: Mar. 8, 2012

(65) Prior Publication Data
US 2013/0213020 A1   Aug. 22, 2013

(30) Foreign Application Priority Data
Aug. 31, 2010   (JP) ................. 2010-194208

(51) Int. Cl.
*F01N 3/00* (2006.01)
*F01N 9/00* (2006.01)
(Continued)

(52) U.S. Cl.
CPC ............ *F01N 9/002* (2013.01); *B60W 10/06* (2013.01); *B60W 10/08* (2013.01); *B60W 20/00* (2013.01);
(Continued)

(58) Field of Classification Search
CPC ....... F01N 9/002; B60W 10/06; B60W 10/08; B60W 10/30; B60W 20/00; B60W 20/1082; F02D 41/029
USPC .................................................... 60/272–324
See application file for complete search history.

(56) References Cited

U.S. PATENT DOCUMENTS 6,744,237 B2 * 6/2004 Kopf et al. ............. 320/104
7,222,051 B2 * 5/2007 Shibata et al. ............ 702/184
(Continued)

FOREIGN PATENT DOCUMENTS

| JP | 3073380 B2 | 8/2000 |
| JP | 2004-92428 A | 3/2004 |

(Continued)

OTHER PUBLICATIONS

International Search Report including English translation dated Nov. 29, 2011 (Two (2) pages).

*Primary Examiner* — Thomas Denion
*Assistant Examiner* — Kelsey Stanek
(74) *Attorney, Agent, or Firm* — Crowell & Moring LLP

(57) ABSTRACT

A load application means, which applies a load to an engine such that a temperature of exhaust gas is raised to a temperature required to burn particulate matter, is comprised of an electric load application means for applying the load to the engine to raise the temperature of the exhaust gas by operating an electric assist motor to generate electric power and a hydraulic load application means for applying the load to the engine to raise the temperature of the exhaust gas by increasing a delivery pressure of a variable displacement hydraulic pump, and a selection control unit is provided for performing control processing to selectively actuate the electric load application means and/or the hydraulic load application means.

3 Claims, 13 Drawing Sheets

(51) Int. Cl.
 B60W 10/06 (2006.01)
 B60W 10/08 (2006.01)
 B60W 20/00 (2006.01)
 B60W 10/30 (2006.01)
 F02D 41/02 (2006.01)

(52) U.S. Cl.
 CPC .... *B60W 2300/17* (2013.01); *B60W 2710/0694* (2013.01); *B60W 2710/083* (2013.01); *F01N 2900/10* (2013.01); *F01N 2900/1606* (2013.01); *F02D 41/021* (2013.01); F02D 41/029 (2013.01); *F02D 2041/026* (2013.01); *F02D 2200/0812* (2013.01); *Y02T 10/6286* (2013.01); *Y02T 10/47* (2013.01); *Y02T 10/54* (2013.01); *Y10S 903/903* (2013.01); *B60Y 2300/476* (2013.01); *B60W 10/30* (2013.01); *B60W 2710/1088* (2013.01); *B60W 20/1082* (2013.01)

(56) References Cited

U.S. PATENT DOCUMENTS

| | | |
|---|---|---|
| 2007/0017215 A1* | 1/2007 | Matheaus et al. ............ 60/286 |
| 2010/0122522 A1* | 5/2010 | Tsukada et al. ............ 60/284 |

FOREIGN PATENT DOCUMENTS

| | | |
|---|---|---|
| JP | 3647319 B2 | 5/2005 |
| JP | 2010-59620 A | 3/2010 |
| JP | 2010-77727 A | 4/2010 |

\* cited by examiner

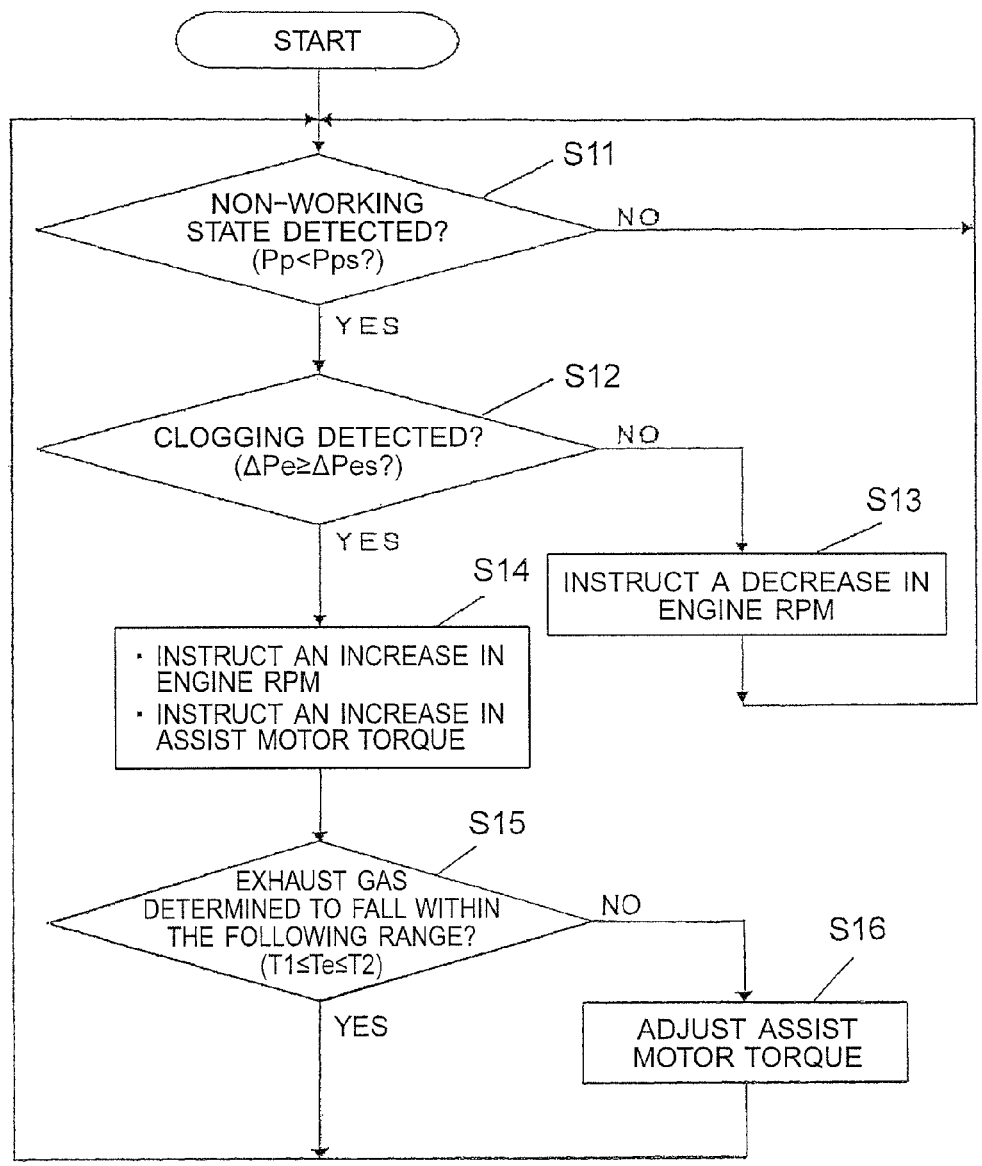

WORKING MACHINE

TECHNICAL FIELD

This invention relates to a working machine, such as a hydraulic excavator, having an exhaust gas purification system.

BACKGROUND ART

Working machine of these days, for example, a hydraulic excavator is generally provided with an engine, a variable displacement hydraulic pump drivable by power transmitted from the engine, a hydraulic actuator drivable by hydraulic oil delivered from the variable displacement hydraulic pump, an actuator control valve interposed between the variable displacement hydraulic pump and the hydraulic actuator and switchable to one of a feed state in which hydraulic oil is to be fed to the hydraulic actuator and a non-feed state in which the hydraulic oil is returned to a hydraulic oil reservoir without feeding it to the hydraulic actuator, and an exhaust gas purification system for trapping, by a filter, particulate matter in exhaust gas produced by incomplete combustion in the engine.

The exhaust gas purification system is arranged in an exhaust pipe through which the exhaust gas from the engine is guided to an exterior of the hydraulic excavator. The particulate matter trapped in the filter of the exhaust gas purification system is burnt with heat of the exhaust gas, and therefore, is eliminated from the filter.

In consideration of energy savings, the hydraulic excavator is constructed such that in its non-working state, in other words, in the above-mentioned non-feed state of the actuator control valve, an engine output is reduced to a level needed for the variable displacement hydraulic pump to deliver pressure oil at a lowest delivery pressure and a smallest delivery rate required for cooling and lubricating a hydraulic circuit.

When the engine output drops, the temperature of exhaust gas also drops. As a consequence, the burning of particulate matter with the heat of the exhaust gas is rendered difficult to occur, and accordingly, the filter of the exhaust gas purification system becomes prone to clogging. To avoid clogging of the filter, the conventional hydraulic working machine disclosed in Patent Document 1 is constructed such that, when clogging of the filter is detected, the delivery pressure and delivery rate of the variable displacement hydraulic pump are increased to make greater a load to be applied to the engine and the temperature of exhaust gas is allowed to rise to a temperature needed for the burning of particulate matter. A means for increasing the delivery pressure of the variable displacement hydraulic pump is a selector valve that can open or close a line through which delivery oil of the variable displacement hydraulic pump is guided from the variable displacement hydraulic pump to the hydraulic oil reservoir. The hydraulic working machine is constructed such that in the non-feed state of an actuator control valve, the delivery pressure is increased by controlling the selector valve.

In the meanwhile, a construction machine has been proposed in Patent Document 2. This construction machine makes use of an electric motor and an electrical storage device (battery, electric double layer capacitor, or the like) to provide an energy efficiency improved over those of conventional hydraulic working machines such that energy savings can be achieved. In this construction machine disclosed in Patent Document 2, a power generator is connected to an engine, electric energy produced at the power generator during low-load operation is stored in a battery, and upon high-load operation, the electric energy is drawn out to reduce a load on the engine.

PRIOR ART DOCUMENT

Patent Document

Patent Document 1: JP-B-3073380
Patent Document 2: JP-B-3647319

DISCLOSURE OF THE INVENTION

Problem to be Solved by the Invention

According to the conventional technology disclosed in Patent Document 1, it is possible to burn particulate matter, which has been accumulated in the exhaust gas purification system, by applying a hydraulic load to the engine such that the temperature of exhaust gas is raised. However, the application of a load by a hydraulic pressure is accompanied by problems such as an increase in leakage due to a rise in the pressure of a hydraulic circuit during non-working time, unexpected actuation of a hydraulic actuator by the rise, and the occurrence of a temperature rise in the hydraulic circuit by hydraulic energy to be restricted out.

In a construction machine with a power generator connected to an engine as disclosed, for example, in Patent Document 2, on the other hand, an engine-loading means can be provided by generating electric power at the power generator instead of arranging a hydraulic engine-loading means as in the conventional technology. In this case, it is possible to burn the particulate matter in the exhaust gas purification system while retaining, as it is, the construction that can realize charging to reduce the fuel consumption by the addition of the power generator. No additional component or part is required accordingly. Moreover, the application of a load by the power generator does not produce problems such as an increase in leakage and a temperature rise in a hydraulic circuit, both of which are the problems associated with the above-mentioned loading by a hydraulic pressure. In addition, a power generator is generally driven by a torque instruction, and compared with a load by a hydraulic pressure, can therefore reduce variations or fluctuations in a load to be applied to the engine, thereby making it possible to apply a load more accurately.

When loading is performed by the power generator, however, the generator may not perform a normal operation due to an abnormal situation such as an error or failure of the generator or an electrical storage device, or the generator may not able to produce a torque for a certain reason such as an energy shortage or overcharge state of the electrical storage device. If such a state arises, a load can no longer be applied to the engine for burning particulate matter, leading to a reduction in the function to eliminate particulate matter in exhaust gas.

The present invention has been completed from the above-mentioned situation of the conventional technologies, and has as an object thereof the provision of a working machine which is provided with an electric load application means and can burn particulate matter trapped in a filter of an exhaust gas purification system even when an electrical drive control system including an electric assist motor and electrical storage device is in failure.

Means for Solving the Problem

To achieve this object, the present invention is characterized in that in a working machine provided with an engine, a variable displacement hydraulic pump drivable by the engine, an electric assist motor for assisting the engine in driving the variable displacement hydraulic pump or generating electric power, an exhaust gas purification system for trapping, by a filter, particulate matter in exhaust gas produced from the engine, an actuator control valve interposed between the variable displacement hydraulic pump and the hydraulic actuator and switchable to one of a feed state in which hydraulic oil from the variable displacement hydraulic pump is to be fed to the hydraulic actuator and a non-feed state in which the hydraulic oil is returned to a hydraulic oil reservoir without feeding the hydraulic oil to the hydraulic actuator, an electrical storage device connected to the electrical assist motor, and a load application means for applying a load to the engine such that a temperature of the exhaust gas is raised to a temperature required to burn the particulate matter, the load application means comprises an electric load application means for applying the load to the engine to raise the temperature of the exhaust gas by operating the electric assist motor to generate electric power and a hydraulic load application means for applying the load to the engine to raise the temperature of the exhaust gas by increasing a delivery pressure of the variable displacement hydraulic pump, and the working machine is further provided with a selection control means for performing control processing to selectively actuate the electric load application means and/or the hydraulic load application means.

In the present invention constructed as described above, the load application means that applies a load to the engine comprises the electric load application means for applying the load to the engine to raise the temperature of the exhaust gas by operating the electric assist motor to generate electric power and the hydraulic load application means for applying the load to the engine to raise the temperature of the exhaust gas by increasing a delivery pressure of the variable displacement hydraulic pump. When the electrical drive control system including the electric assist motor and electrical storage device is normally functioning, it is, therefore, only necessary to select by the selection control means such that control processing is performed to actuate, for example, the electric load application means. As a consequence, the particulate matter accumulated in the exhaust gas purification system can be burnt at high accuracy. If the electrical drive control system including the electric assist motor and electrical storage device develops an abnormality during actuation of the electric load application means as described above and the electric load application means fails to function any longer, it is only necessary to select, by the selection control means, control processing that actuates the hydraulic load application means. As a result, the particulate matter accumulated in the exhaust gas purification system can be burnt although the hydraulic load application means produces a greater energy loss or the like than the electric load application means. Therefore, the working machine according to the present invention is provided with the electric load application means, and can burn particulate matter trapped in the filter of the exhaust gas purification system even when an electrical drive control system including the electric assist motor and electrical storage device is in failure.

The present invention may also be characterized in that in the above-described invention, the selection control means comprises an abnormality monitoring means for monitoring an abnormality of the electrical drive control system including the electric assist motor and electrical storage device, and, when the abnormality is monitored by the abnormality monitoring means, performs control processing to actuate the hydraulic load application means.

The present invention may also be characterized in that in the above-described invention, the selection control means comprises a storage state monitoring means for monitoring a storage state of the electrical storage device, and according to the storage state monitored by the storage state monitoring means, performs one of control processing that actuates the hydraulic load application means alone, control processing that actuates the electric load application means alone, and control processing that actuates both of the hydraulic load application means and electric load application means.

The present invention may also be characterized in that in the above-described invention, upon application of the load to the engine, the selection control means performs the control processing, in which the hydraulic load application means alone is actuated, when a remaining storage level of the electrical storage device as monitored by the storage state monitoring means is lower than a preset lower limit threshold value, the control processing, in which the electric load application means alone is actuated, when the remaining storage level of the electrical storage device is higher than a preset higher limit threshold value, or the control processing, in which both of the hydraulic load application means and electric load application means are actuated, when the remaining storage level of the electrical storage device is between the higher limit threshold value and the lower limit threshold value.

The present invention may also be characterized in that in the above-described invention, upon the control processing in which both of the hydraulic load application means and electric load application means are actuated, the selection control means performs, according to a storage voltage of the electrical storage device, control processing that changes actuation rates of the hydraulic load application means and electric load application means.

The present invention may also be characterized in that in the above-described invention, upon the control processing in which both of the hydraulic load application means and electric load application means are actuated, the selection control means performs control processing that increases the application rate of the electric load application means when the storage voltage of the electrical storage device is around the lower limit threshold value but increases the application rate of the hydraulic load application means when the storage voltage of the electrical storage device is around the higher limit threshold value.

The present invention may also be characterized in that in the above-described invention, the working machine further comprises a temperature sensing means for detecting the temperature of the exhaust gas, an exhaust gas temperature determination means for determining whether or not the temperature of the exhaust gas as detected by the temperature sensing means is a temperature in a preset temperature range which can be considered to be minimum required to burn the particulate matter, and an adjustment means for adjusting the actuation of the load application means, which is selected by the selection control means, such that the temperature of the exhaust gas becomes a temperature in the temperature range when the temperature of the exhaust gas as detected by the temperature sensing means is determined not to be a temperature in the temperature range by the exhaust gas temperature determination means.

Advantageous Effects of the Invention

In the present invention, the load application means, which applies a load to the engine to raise the temperature of exhaust gas to a temperature required to burn particulate matter, comprises the electric load application means for applying the load to the engine to raise the temperature of the exhaust gas by operating the electric assist motor, which is connected to the engine, to generate electric power and the hydraulic load application means for applying the load to the engine to raise the temperature of the exhaust gas by increasing the delivery pressure of the variable displacement hydraulic pump, and the working machine is further provided with the select ion control means for performing control processing to selectively actuate the electric load application means and/or the hydraulic load application means. Even when the electrical drive control system including the electric assist motor and electrical storage device is in failure in the working machine provided with the electric load application means, the particulate matter trapped in the filter of the exhaust gas purification system can be burnt by selectively actuating the electric load application means and hydraulic load application means through the control processing by the selection control means. As a consequence, the eliminating function for the particulate matter in exhaust gas as accumulated in the exhaust gas purification system can be improved over before, thereby making it possible to provide the working machine with excellent accuracy in the purification of exhaust gas from the engine.

BRIEF DESCRIPTION OF THE DRAWINGS

FIG. 13 is a flowchart showing a control processing routine upon applying an electric load in the main controller arranged in the second embodiment.

MODES FOR CARRYING OUT THE INVENTION

Embodiments of the working machine according to the present invention will hereinafter be described with reference to the drawings.

[Construction of Hydraulic Excavator According to First Embodiment]

Figure 1:
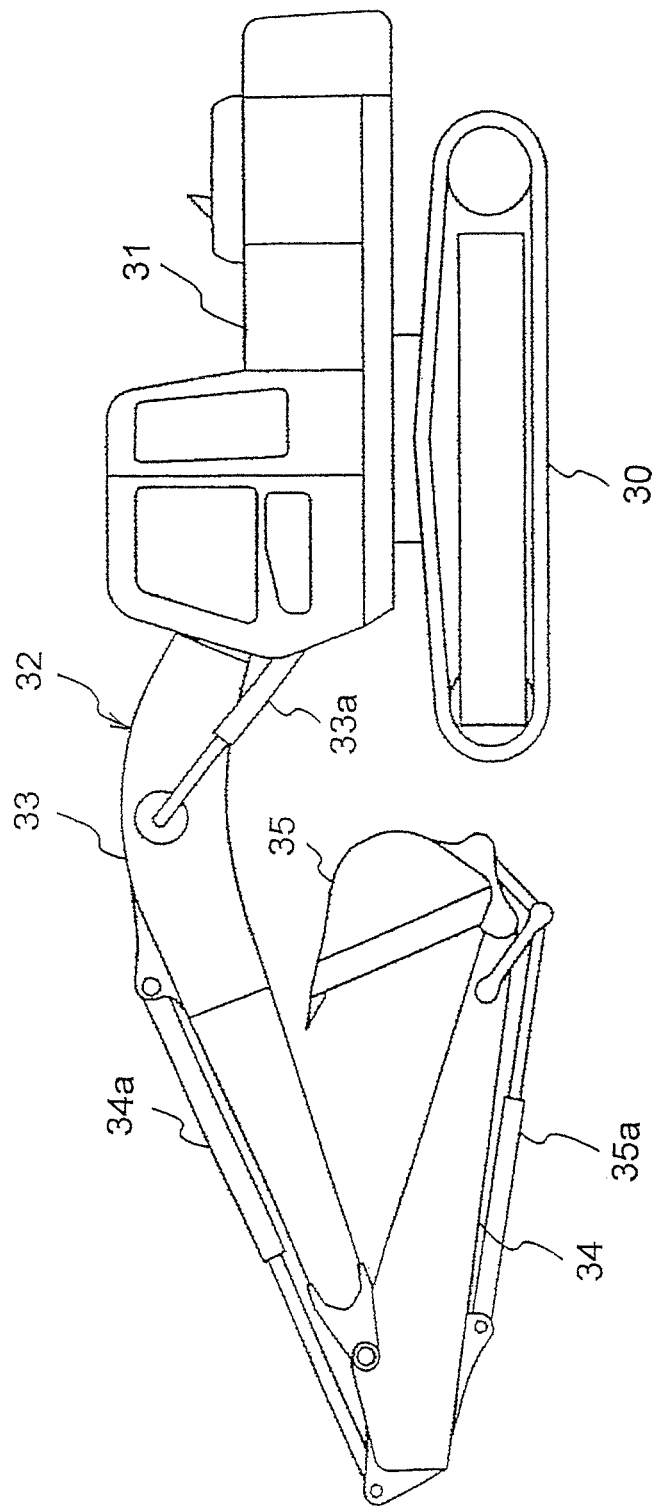
FIG. 1 is a side view showing a hydraulic excavator referred to as one example of the working machine according to the present invention.

FIG. 1 is a side view showing a hydraulic excavator referred to as one example of the working machine according to the present invention. As shown in FIG. 1, this hydraulic excavator is provided with a travel base 30, an upper structure 31 arranged on the travel base 30, and working equipment 32 attached tiltably in an up-and-down direction to the upper structure 31 to perform earth/sand digging work or the like. The working equipment 32 includes a boom 33 attached tiltably in the up-and-down direction to the upper structure 31, a boom cylinder 33a for actuating the boom 33, an arm 34 attached tiltably in the up-and-down direction to a free end of the boom 33, an arm cylinder 34a for actuating the arm 34, a bucket 35 attached tiltably in the up-and-down direction to a free end of the art 34, and a bucket cylinder 35a for actuating the bucket 35.

[Hydraulic System Arranged in First Embodiment]

Figure 2:
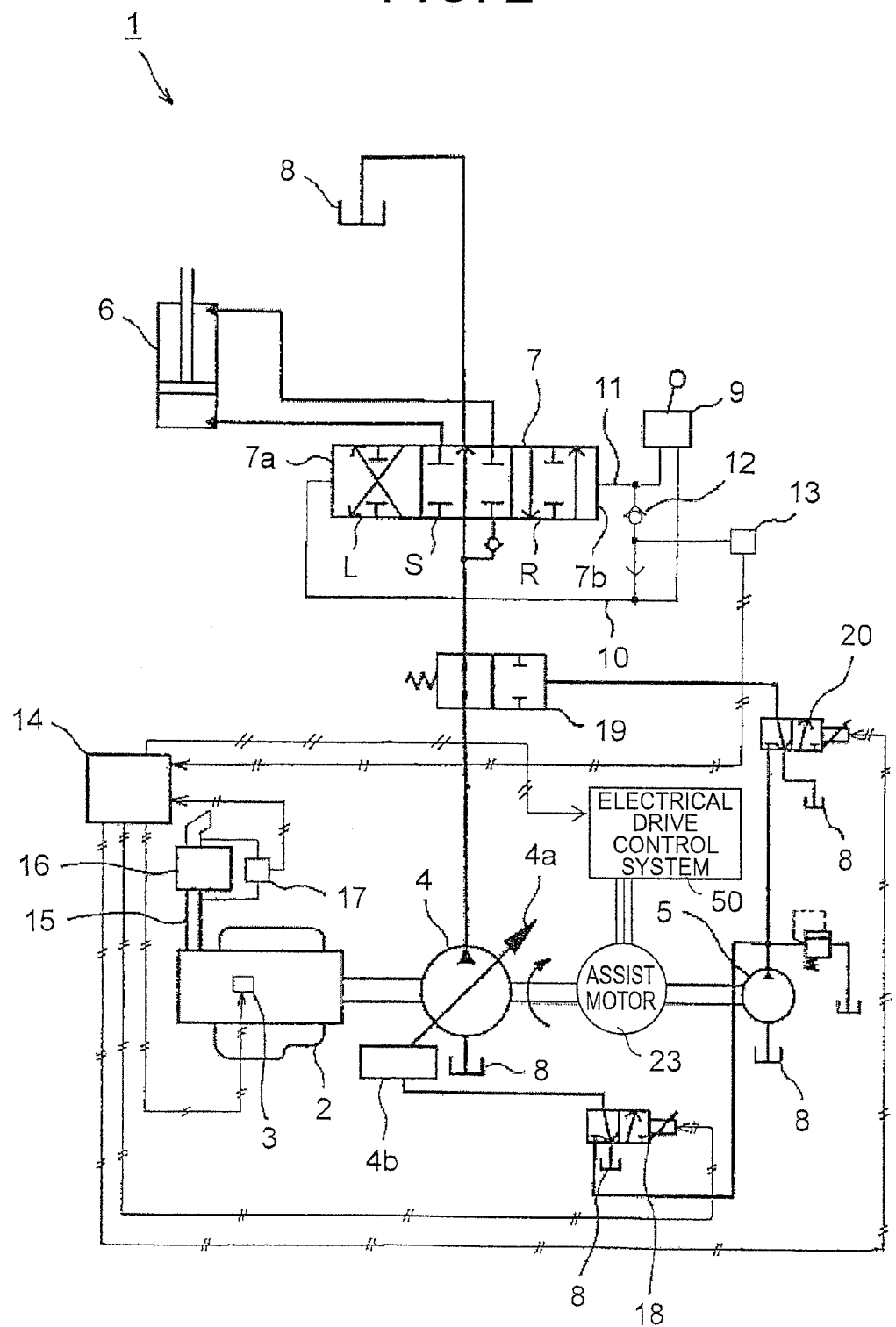
FIG. 2 is an electro hydraulic circuit diagram illustrating a first embodiment of a hydraulic drive system arranged in the hydraulic excavator shown in FIG. 1.

FIG. 2 is an electro hydraulic circuit diagram illustrating a first embodiment of a hydraulic drive system arranged in the hydraulic excavator shown in FIG. 1.

As shown in FIG. 2, the hydraulic drive system 1 arranged in the hydraulic excavator according to this embodiment is provided with an engine 2 (for example, a diesel engine) electronically controlled in fuel injection quantity by an engine controller 3, a variable displacement hydraulic pump 4 and pilot pump 5 (fixed displacement pump) drivable by power transmitted from the engine 2, and a hydraulic actuator 6 drivable by hydraulic oil delivered from the variable displacement hydraulic pump 4. In FIG. 1, hydraulic cylinder such as the above-mentioned boom cylinder 33a and arm cylinder 35a are shown as examples of the hydraulic actuator 6 for the sake of brevity of the description, but the hydraulic actuator 6 is not limited to a hydraulic cylinder. The hydraulic actuator 6 may also be a hydraulic motor for allowing the travel base 30 to travel, or may also be a swing motor for rotating the upper structure 31.

Interposed between the variable displacement hydraulic pump 4 and the hydraulic actuator 6 is an actuator control valve 7, which is switchable to one of a feed state, in which hydraulic oil from the variable displacement hydraulic pump 4 is fed to the hydraulic actuator 6, and a non-feed state, in which the hydraulic oil is not fed to the hydraulic actuator 6 but is returned to a hydraulic oil reservoir 8. This actuator control valve 7 is a 3-position valve. In a neutral position S out of its three valve positions, the actuator control valve 7 is in the non-feed state shown in FIG. 2, and therefore, guides the hydraulic oil from the variable displacement hydraulic pump 4 to the hydraulic oil reservoir 8. In each of valve positions L,R on left and right sides of the neutral position S, the actuator control valve 7 is in the above-mentioned feed state.

The actuator control valve 7 is also a hydraulically-piloted valve. A pilot pressure to be applied to the actuator control valve 7 is produced by a control device 9, which includes a pilot valve, while using as a primary pressure a delivery pressure of the pilot pump 5. The actuator control valve 7 is switched from the neutral position S toward the valve position L when a pilot pressure produced by the control device 9 is applied to a first pressure receiving portion 7a via a first pilot line 10, but is conversely switched from the neutral position S toward the valve position R when a pilot pressure produced by the control device 9 is applied to a second pressure receiving portion 7b via a second pilot line 11.

The first and second pilot lines 10,11 are connected to a high pressure selector valve 12. A pressure on a high pressure side as selected by the high pressure selector valve 12 is detected by a pilot pressure sensor 13. This pilot pressure sensor 13 is constructed to convert a detected pressure Pp to a pilot pressure signal (electrical signal), and is arranged to input this pilot pressure signal to a controller 14.

The engine 2 is provided with an exhaust pipe 15 through which exhaust gas is guided to an exterior of the hydraulic excavator. This exhaust pipe 15 is provided at an intermediate position thereof with an exhaust gas purification system 16, which traps in a filter particulate matter in exhaust gas as produced by combustion in the engine 2.

The exhaust pipe 15 is provided with a differential pressure sensor 17 for detecting a differential pressure between an exhaust gas pressure on an upstream side of the exhaust gas purification system 16 and an exhaust gas pressure on a downstream side of the exhaust gas purification system 16. When the clogging amount of the filter of the exhaust gas purification system 16 increases, the flow path resistance to the exhaust gas increases so that the exhaust gas pressure on the upstream side becomes higher than the exhaust gas pressure on the downstream side. Accordingly, the differential pressure sensor 17 detects a differential pressure indicating that the exhaust gas pressure on the upstream side is higher than that on the downstream side. The differential pressure sensor 17 is constructed to convert a detected differential pressure $\Delta$Pe to a differential pressure signal (electrical signal), and is arranged to input this differential pressure signal to the controller 14.

The variable displacement hydraulic pump 4 has a displacement varying mechanism 4a and a hydraulically-piloted regulator 4b. The displacement varying mechanism 4a enables to vary the displacement of the variable displacement hydraulic pump 4, and the hydraulically-piloted regulator 4b controls this displacement varying mechanism 4a. A pilot pressure to be applied to the regulator 4b is produced by a displacement control valve 18. Using a delivery pressure of the pilot pump 5 as a primary pressure, the displacement control valve 18 produces the pilot pressure. This displacement control valve 18 is a solenoid valve, and responsive to a displacement control signal (electric current) from the controller 14, varies the pilot pressure to be applied to the regulator 4b.

In a line located on an upstream side of the actuator control valve 7 as viewed in the direction of a flow of pressure oil delivered from the variable displacement hydraulic pump 4, a variable restrictor 19 is arranged as a delivery pressure control means capable of raising a delivery pressure. This variable restrictor 19 is a spring-return, 2-position valve, which with an open position being set as an initial position, can move a valve element toward a closed position. This variable restrictor 19 is also a hydraulically-piloted valve. A pilot pressure to be applied to the variable restrictor 19 is produced by a delivery pressure control valve 20. Using a delivery pressure of the pilot pump 5 as a primary pressure, the delivery pressure control valve 20 produces the pilot pressure. This delivery pressure control valve 20 is a solenoid valve, and responsive to a delivery pressure control signal (electric current) from the controller 14, varies the pilot pressure to be applied to the variable restrictor 19. The delivery pressure control valve 20 and controller 14 make up a control means for the variable restrictor 19.

An electric assist motor 23 is connected to a drive shaft from the engine, and performs an assist to the engine 2 or power generation according to an electrical drive control system 50 in which control means and an electrical storage device are included. This electric assist motor 23 is generally control led inconsideration of fuel cost savings on the engine 2. To reduce fluctuations in engine load, for example, power generation is performed at a low engine load while a drive assist is performed at a high engine load.

[Electrical Drive Control System Arranged in the First Embodiment]

Figure 3:
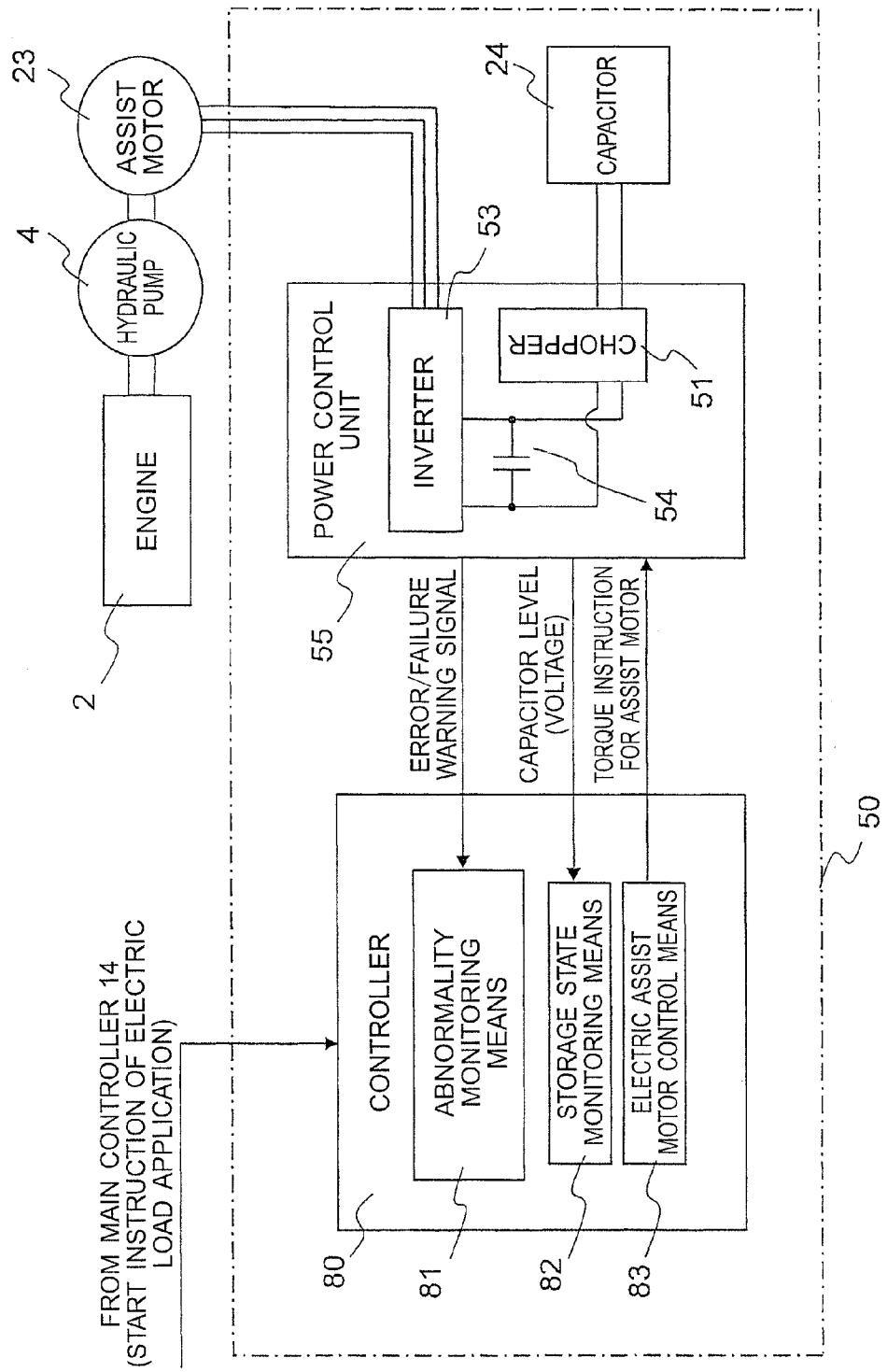
FIG. 3 is a block diagram depicting the construction of an electrical drive control system arranged in the hydraulic drive system illustrated in FIG. 2.

FIG. 3 is a block diagram depicting the construction of the electrical drive control system arranged in the hydraulic drive system illustrated in FIG. 2.

A DC power from a capacitor 24 is boosted to a predetermined bus voltage by a chopper 51 arranged in a power control unit 55, and is inputted to an inverter 53 for driving the electric assist motor 23. A smoothing capacitor 54 is arranged to stabilize the bus voltage. Depending on the drive state of the electric assist motor 23 (whether an engine assist or power generation is performed), the capacitor 24 is charged or discharged.

A controller 80, which performs control of the electric assist motor 23 and capacitor 24, gives an instruction to the power control unit 55 to perform the corresponding control.

It is designed to perform loading through power generation by the electric assist motor 23 during normal time of the hydraulic excavator according to this embodiment, in other words, while the electrical drive control system 50 is normally functioning.

The controller 80 connected to the main controller 14 is provided with an abnormality monitoring means 81, a storage state monitoring means 82 and an electric assist motor control means 83. The abnormality monitoring means 81 monitors an error or failure of the electrical drive control system 50 which includes the electric assist motor 23, capacitor 24 and power control unit 55. The storage state monitoring means 82 monitors the state of storage in the electrical storage device, specifically the capacitor 24. The electric assist motor control means 83 controls a drive assist or power generation by the electric assist motor 23.

When the controller 80 gives to the power control unit 55 a torque for the electric assist motor 23 upon a drive torque or a torque instruction value for the electric assist motor 23 upon power generation, the power control unit 55 controls the electric assist motor 23 such that the instructed torque is obtained.

When the occurrence of an abnormality in an electric drive system such as the power control unit 55, electric assist motor 23 and capacitor 24 is detected via the abnormality monitoring means 81 or when the storage level of the capacitor 24 is detected to have fallen outside a predetermined range via the storage state monitoring means 82, control processing is performed by the electric assist motor control means 83 to stop the power generation or drive by the electric assist motor 23.

The above-mentioned inverter 53 of the power control unit 55 included in the electrical drive control system 50 and the above-mentioned electric assist motor control means 83 of the controller 80 included in the electrical drive control system 50 make up an electric load application means for applying a load to the engine 2 to raise the temperature of exhaust gas from the engine 2 by operating the electric drive assist motor 23 to generate power.

The above-mentioned variable restrictor 19, delivery pressure control valve 20 and pilot pump 5 make up hydraulic load application means for applying a load to the engine 2 to raise the temperature of exhaust gas from the engine 2 by raising the delivery pressure of the variable displacement hydraulic pump 4.

Further, the main controller 14 and the controller 80 of the electrical drive system 50, said controller 80 including the abnormality monitoring means 81, storage state monitoring means 82 and electric assist motor control means 83, make up a selection control means for performing control processing to selectively actuate the above-mentioned electric load application means and/or the hydraulic load application means.

[Control Processing for Actuating the Hydraulic Load Application Means in the First Embodiment]

Figure 4:
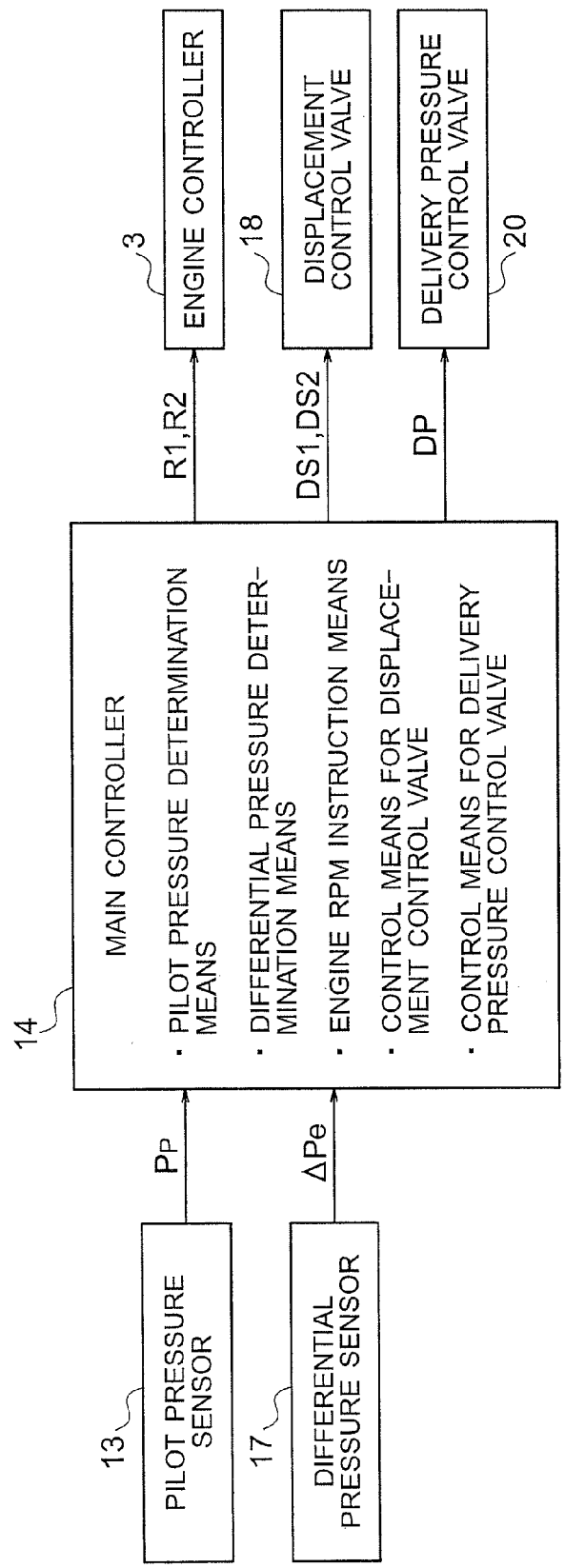
FIG. 4 is a block diagram of a hydraulic control system, which is arranged in the first embodiment and includes a main controller.
Figure 5:
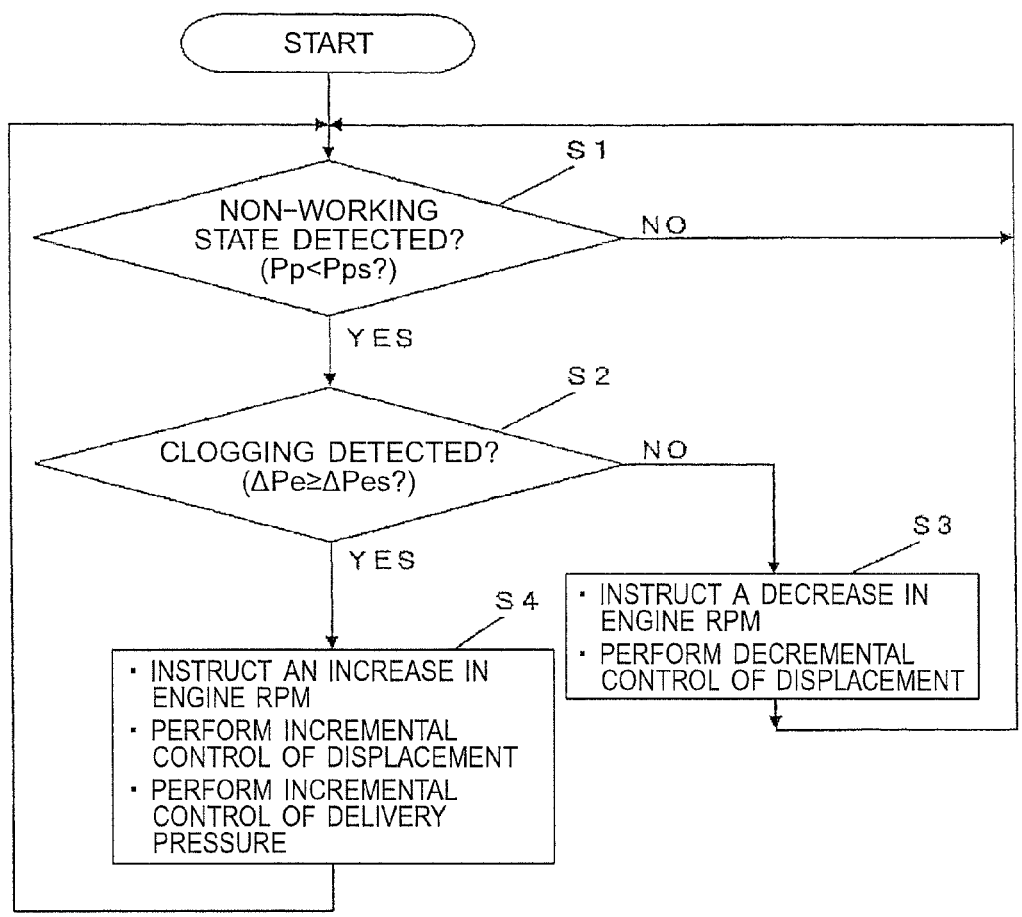
FIG. 5 is a flow chart showing a control processing routine in the main controller arranged in the first embodiment.

FIG. 4 is a block diagram of a hydraulic control system, which is arranged in the first embodiment and includes a main controller, and FIG. 5 is a flow chart showing a control processing routine in the main controller arranged in the first embodiment.

The controller 14 has CPU, ROM and RAM, and is set by a computer program as will be described next.

As illustrated in FIG. 4, the main controller 14 is set to function as a pilot pressure determination means. This pilot pressure determination means determines whether or not a detected pressure Pp indicated by a pilot pressure signal from the pilot pressure sensor 13 is lower than a preset pressure Pps below which the actuator control valve 7 is to be actuated; in other words, whether a state of the actuator control valve 7 is the feed state, in which hydraulic oil from the variable displacement hydraulic pump 4 is fed to the hydraulic actuator 6, or the non-feed state, in which the hydraulic oil from the variable displacement hydraulic pump 4 is not fed to the hydraulic actuator 6. The feed state is a working state of the hydraulic excavator, while the non-feed state is a non-working state of the hydraulic excavator. It is, therefore, designed such that whether the hydraulic excavator is in a working state or in a non-working state can be detected by the high pressure selector valve 12, pilot pressure sensor 13 and main controller 14.

Further, the main controller 14 is also set to function as a differential pressure determination means. This differential pressure determination means determines whether or not a detected differential pressure ΔPe indicated by a differential pressure signal from the differential pressure sensor 17 is not lower than a preset reference differential pressure ΔPes. As a result of clogging of the filter of the exhaust gas purification system 16, the flow path resistance to exhaust gas increases so that the detected differential pressure ΔPe becomes higher. It is, therefore, designed such that clogging of the filter of the exhaust gas purification system 16 can be determined by the differential pressure sensor 17 and main controller 14.

The main controller 14 is also set to function as an engine rpm instruction means. This engine rpm instruction means delivers a preset first target rpm signal R1 to the engine controller 3. In consideration of energy savings, the first target rpm signal R1 has been set to lower the engine rpm to a level needed for the variable displacement hydraulic pump 4 to deliver pressure oil at a lowest delivery pressure and a smallest delivery rate required for cooling and lubricating a hydraulic circuit.

In addition, the engine rpm instruction means also performs control to switch the target rpm signal, which is to be delivered to the engine controller 3, from the first target rpm signal R1 to a second target rpm signal R2. This second target rpm is higher than the above-mentioned first target rpm.

The main controller 14 is also set to function as a control means for the displacement control valve. This control means for the displacement control valve delivers a first displacement control signal DS1, which corresponds to a preset first displacement, to the displacement control valve 18. When the displacement control valve 18 applies to the regulator 4b a pilot pressure responsive to the first displacement control signal DS1, the regulator 4b operates the displacement varying mechanism 4a to set the displacement of the variable displacement hydraulic pump 4 at the first displacement. When the variable displacement hydraulic pump 4 is driven by the engine 2 operated at the above-mentioned first target rpm in the state that it is set at the first displacement volume, pressure oil is delivered at the above-mentioned smallest delivery rate.

In addition, the control means for the displacement volume control valve also performs control to switch the displacement control signal, which is to be delivered to the displacement control valve 18, from the above-mentioned first displacement control signal DS1 to a preset second displacement control signal DS2. When the displacement control valve 18 applies to the regulator 4b a pilot pressure responsive to the second displacement control signal DS2, the regulator 4b operates the displacement varying mechanism 4a to set the displacement of the variable displacement hydraulic pump 4 at the second displacement. When the variable displacement hydraulic pump 4 is driven by the engine 2 operated at the above-mentioned second target rpm in the state that it is set at the second displacement volume, pressure oil is delivered at a delivery rate greater than the above-mentioned smallest delivery rate.

The main controller 14 is also set to function as a control means for the delivery pressure control valve. This control means for the delivery pressure control valve delivers to the delivery pressure control valve 20 a delivery pressure control signal DP of a preset current value. When the delivery pressure control valve 20 applies to the variable restrictor 19 a pilot pressure responsive to the delivery pressure control signal DP, the valve position of the variable restrictor 19 moves from the open position toward the closed position. As a consequence, the delivery pressure rises.

A relationship among the second target rpm, the second displacement and a reference delivery pressure Pds is set such that by increasing a load (engine load) to be applied to the engine 2, the temperature of exhaust gas can be raised to a minimum level needed to raise it to a temperature required for the burning of particulate matter. In other words, the reference delivery pressure Pds is set such that the engine load based on the second target rpm and the second displacement becomes equal to the minimum level for raising the temperature of exhaust gas to a temperature needed for the burning of particulate matter.

Furthermore, the main controller 14 is also set to perform the processing by the respective means as a flow illustrated in FIG. 5. A description will be made about the flow of processing.

The main controller 14 first functions as the pilot pressure determination means, and determines whether or not a detected pressure Pp indicated by a pilot pressure signal from the pilot pressure sensor 13 is lower than the preset pressure Pps (step S1). The main controller 14 repeats this step S1 as long as the detected pressure Pp falls lower than the preset pressure Pps, in other words, as long as a non-working state of the hydraulic excavator is not detected ("NO" in step S1).

Upon detection of a non-working state of the hydraulic excavator ("YES" in step S1), the controller 14 then functions as the differential pressure determination means, and determines whether or not a detected differential pressure ΔPe indicated by a differential pressure signal from the differential pressure sensor 17 is not lower than the reference differential pressure ΔPes (step S2). When the detected differential pressure ΔPe is determined not to be lower than the reference differential pressure ΔPes, in other words, when clogging of the filter of the exhaust gas purification system 16 is not detected ("NO" in step S2), the main controller 14 functions as the engine rpm instruction means and the control means for the displacement control valve, and delivers the first target rpm signal R1 to the engine controller 3 and also the first displacement control signal DS1 to the displacement control valve 18. At this time, the valve position of the actuator control valve 7 is the neutral position S, and the valve position of the variable restrictor 19 is the open position. When the engine rpm reaches the first target rpm and the displacement reaches the first displacement, the variable displacement hydraulic pump 4 is, therefore, brought to a state, in which it delivers pressure oil at a lowest delivery pressure and a smallest delivery rate required for the cooling and lubrication of the hydraulic circuit. Subsequently, the main controller 14 performs again the processing from step S1. In a state that a non-working state of the hydraulic excavator has been detected and no clogging has been detected, "step S1→step S2→step S3→step S1" is repeated. As a consequence, the variable displacement hydraulic pump 4 is maintained in the state that it delivers pressure oil at a lowest delivery pressure and a smallest delivery rate required for the cooling and lubrication of the hydraulic circuit.

Upon detection of clogging of the filter of the exhaust gas purification system 16 ("YES" in step S2), the main controller 14 then functions as the engine rpm instruction means. The main controller 14, therefore, switches the target rpm signal, which is to be delivered to the engine controller 3, from the first target rpm signal R1 to the second target rpm signal R2 to increase the engine rpm to the second target rpm (step S4).

At this time, the main controller 14 also functions as the control means for the displacement control valve, and switches the displacement control signal, which is to be delivered to the displacement control valve 18, from the first displacement control signal DS1 to the second displacement control signal DS2 to increase the displacement of the variable displacement hydraulic pump 4 to the second displacement (step S4).

Further, the main controller 14 also functions as the control means for the delivery pressure control valve, and delivers a delivery pressure control signal DP to the delivery pressure control valve 20 (step S4). When the delivery pressure control valve 20 applies to the variable restrictor 19 a pilot pressure responsive to the delivery pressure control signal DP, the valve position of the variable restrictor 19 moves from the open position toward the closed position, and as a consequence, the delivery pressure increases.

The hydraulic drive system 1 arranged in this embodiment is designed to increase the delivery rate by a rise in engine rpm and an increase in displacement when desired to increase the engine output to burn particulate matter, but may be designed to increase the delivery rate by raising the engine rpm alone.

In the hydraulic drive system 1 arranged in this embodiment, the delivery rate control valve 20 and main controller 14 make up the control means for the hydraulically-piloted, variable restrictor 19. As an alternative, a solenoid-piloted, variable restrictor may be arranged in place of the hydraulically-piloted, variable restrictor 19 and delivery rate control valve 20, in other words, the delivery pressure control means may be comprised of a solenoid-piloted, variable restrictor, and the main controller 14 alone may function as a control means for the variable restrictor. It is to be noted that, when the variable restrictor is of the hydraulically-piloted type, there is an advantage in that power for a variable restriction is available more easily compared with the case of the solenoid-pilot type. It is also to be noted that, when the variable restrictor is of the solenoid-pilot type, on the other hand, there is an advantage in that the hydraulic circuit can be simplified compared with the case of the hydraulically-piloted type.

[Control Processing to Actuate the Electric Load Application Means in the First Embodiment]

Load application-starting conditions for applying a load to the engine 2 to burn particulate matter accumulated in the exhaust gas purification system 16 and a determination means for the conditions are the same as in the above-mentioned control processing by the hydraulic load application means.

When a load application is started by the main controller 14, the main controller 14 outputs an electric load-application start instruction to the controller 80 in the electrical drive control system 50 as depicted in FIG. 3.

Upon input of the electric load-application start instruction, the controller 80 outputs an electric load application torque T as a torque instruction to the power control unit 55, and the power control unit 55 operates the electric assist motor 23 to generate electric power based on the torque instruction.

This electric load application torque T is an electric assist motor torque needed to give to an engine load that results in an exhaust gas temperature required to burn particulate matter, and has been set beforehand.

When the application of a load to the engine 2 is performed by an electric load application, it is possible to reduce variations or fluctuations in the load to be applied to the engine 2 compared with the application of a load by a hydraulic pressure, and hence, to perform the application of the load at higher accuracy, because the electric assist motor 23 is driven by a torque instruction.

In the application of a hydraulic load, the energy of the engine 2 as required to raise the temperature of exhaust gas has been discarded as a loss in its entirety. In this application of an electric load, further fuel cost savings can be realized because the generated energy can be recovered by charging it in the capacitor 24.

Because a load to be applied to the engine 2 is determined by a power generation torque and rpm of the electric assist motor 23, the load may also be applied to the engine 2 by changing not only the power generation torque but also the engine rpm in the application of an electric load.

[Selection of Actuation Control of the Electric Load Application Means and/or Actuation Control of the Hydraulic Load Application Means in the First Embodiment]

The hydraulic excavator according to this embodiment is configured to enable both of control processing to actuate the above-mentioned hydraulic load application means and control processing to actuate the above-mentioned electric load application means. The control processing to actuate the hydraulic load application means and the control processing to actuate the electric load application means are also configured to be enabled independently of each other. This embodiment can, therefore, selectively enable the control processing to actuate the hydraulic load application means alone, the control processing to actuate the electric load application means alone, or the control processing to actuate both of the hydraulic load application means and electric load application means (combined use of both of the load applications).

Figure 6:
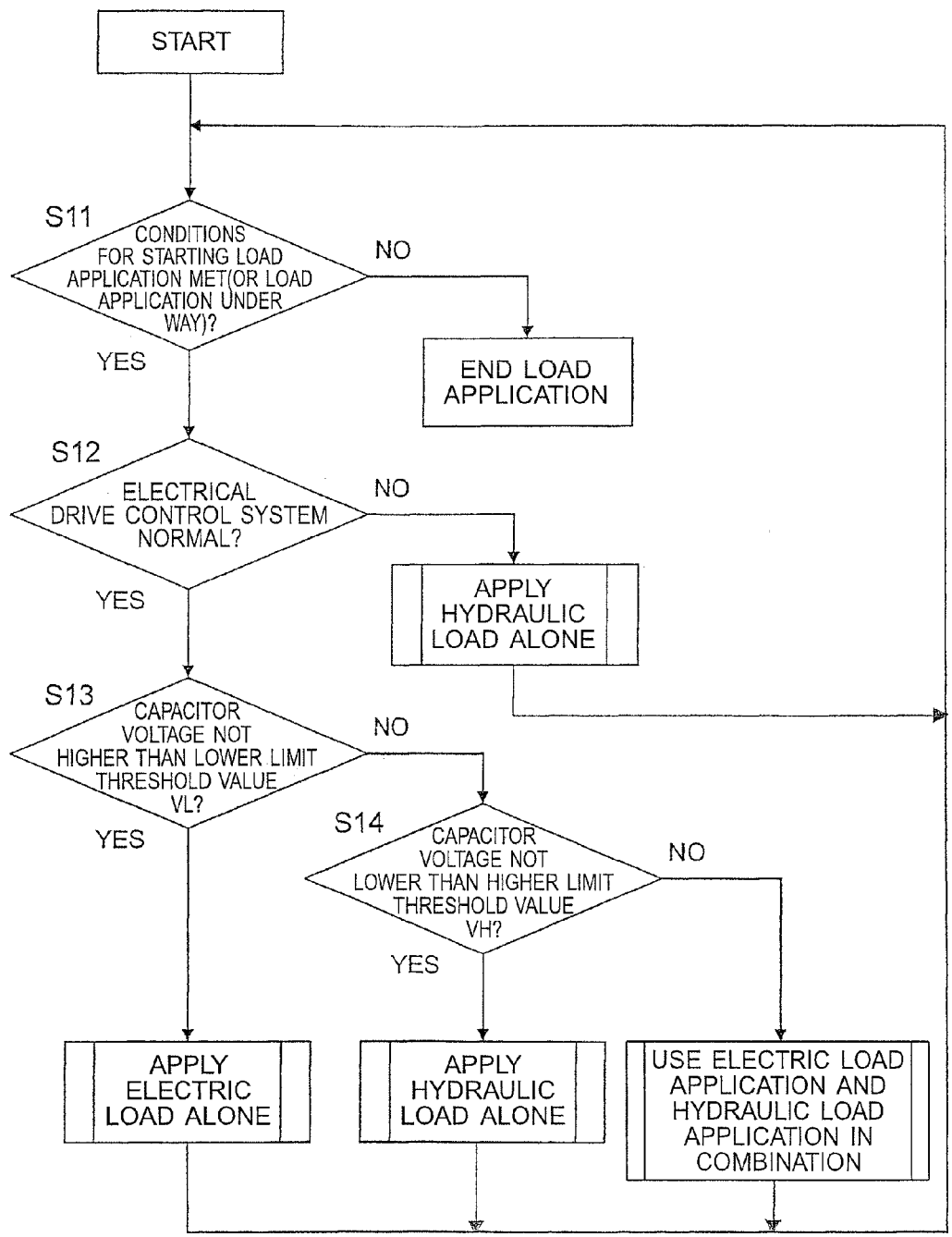
FIG. 6 is a flow chart showing a control processing routine in the main controller and a controller for the electrical drive control system, both of which are arranged in the first embodiment, upon applying a load to the engine.

FIG. 6 is a flow chart showing a control processing routine in the main controller and a controller for the electrical drive control system, both of which are arranged in the first embodiment, upon applying a load to the engine.

With reference to FIG. 6, a description will hereinafter be made about a selection procedure of the electric load application and/or hydraulic load application in the hydraulic excavator according to this embodiment. It is to be noted that also in this case, load application-starting conditions for applying a load to the engine 2 to burn particulate matter accumulated in the exhaust gas purification system 16 and a determination means for the conditions are the same as those described in the paragraphs of the above-mentioned control processing to actuate the hydraulic load application means (step S11).

When a load application is started by the main controller 14, it is first determined via the abnormality monitoring means 81 of the controller 80 in the electrical drive control system 50 whether or not the state of the electrical drive control system 50 is normal (step S12). When the electrical drive control system 50 is determined to be abnormal, the above-mentioned control processing that actuates the hydraulic load application means is performed.

Next, it is determined via the storage state monitoring means 82 of the controller 80 whether or not a capacitor voltage is not higher than a preset lower limit threshold value VL (step S13). When the capacitor voltage is determined not to be higher than the lower limit threshold value VL, the above-mentioned control processing that actuates the electric load application means alone is performed.

When the capacitor voltage is determined to be higher than the lower limit threshold value VL, the capacitor voltage is determined whether or not it is not lower than a higher limit threshold value VH (step S14). When the capacitor voltage is determined not to be lower than the higher limit threshold value VH, the above-mentioned control processing that actuates the hydraulic load application means alone is performed.

When the capacitor voltage is between the lower limit threshold value VL and the higher limit threshold value VH, the above-mentioned combined-use control processing that actuates both of the electric load application means and hydraulic load application means is performed.

In this embodiment, the main controller 14 and the controller 80 included in the electrical drive control system 50 are indicated as separate controllers. These controllers may, however, be constructed by a single controller that is equipped with the respective functions of the above-mentioned two controllers.

[Control Processing to Actuate Both of the Electric Load Application Means and Hydraulic Load Application Means in the First Embodiment]

Figure 7:
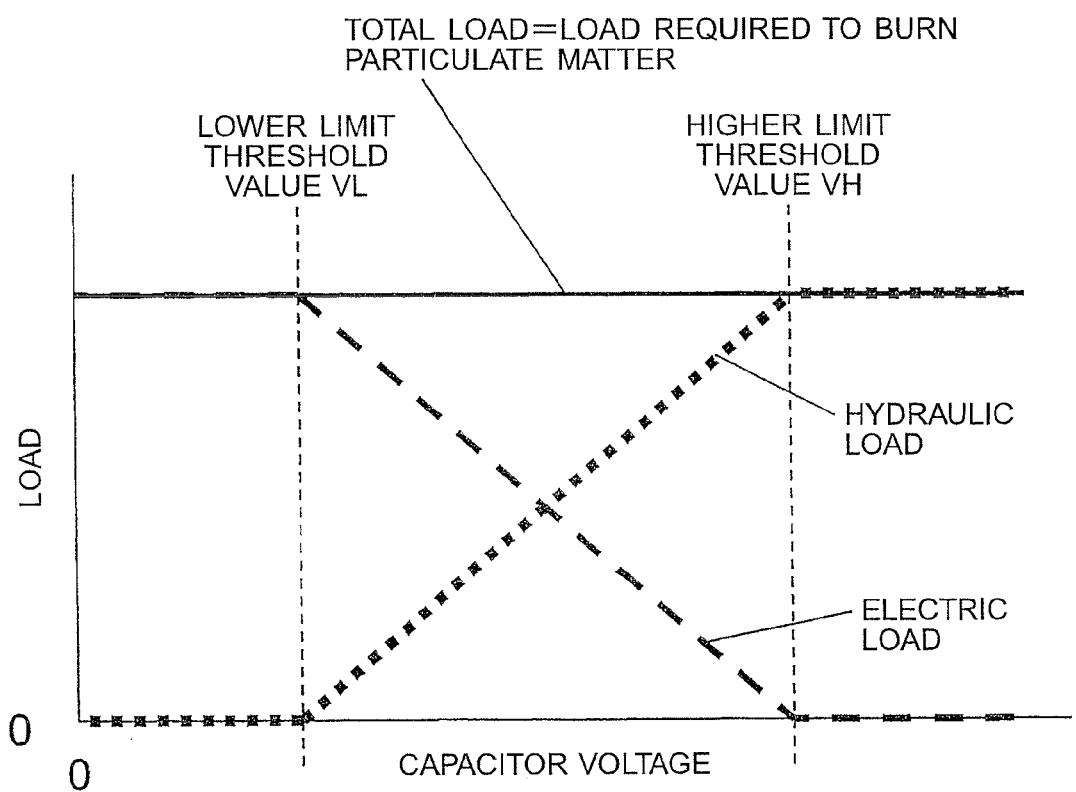
FIG. 7 is a diagram illustrating a relationship between an electric load and a hydraulic load relative to capacitor voltage upon actuating both of an electric load application means and hydraulic load application means arranged in the first embodiment.
Figure 8:
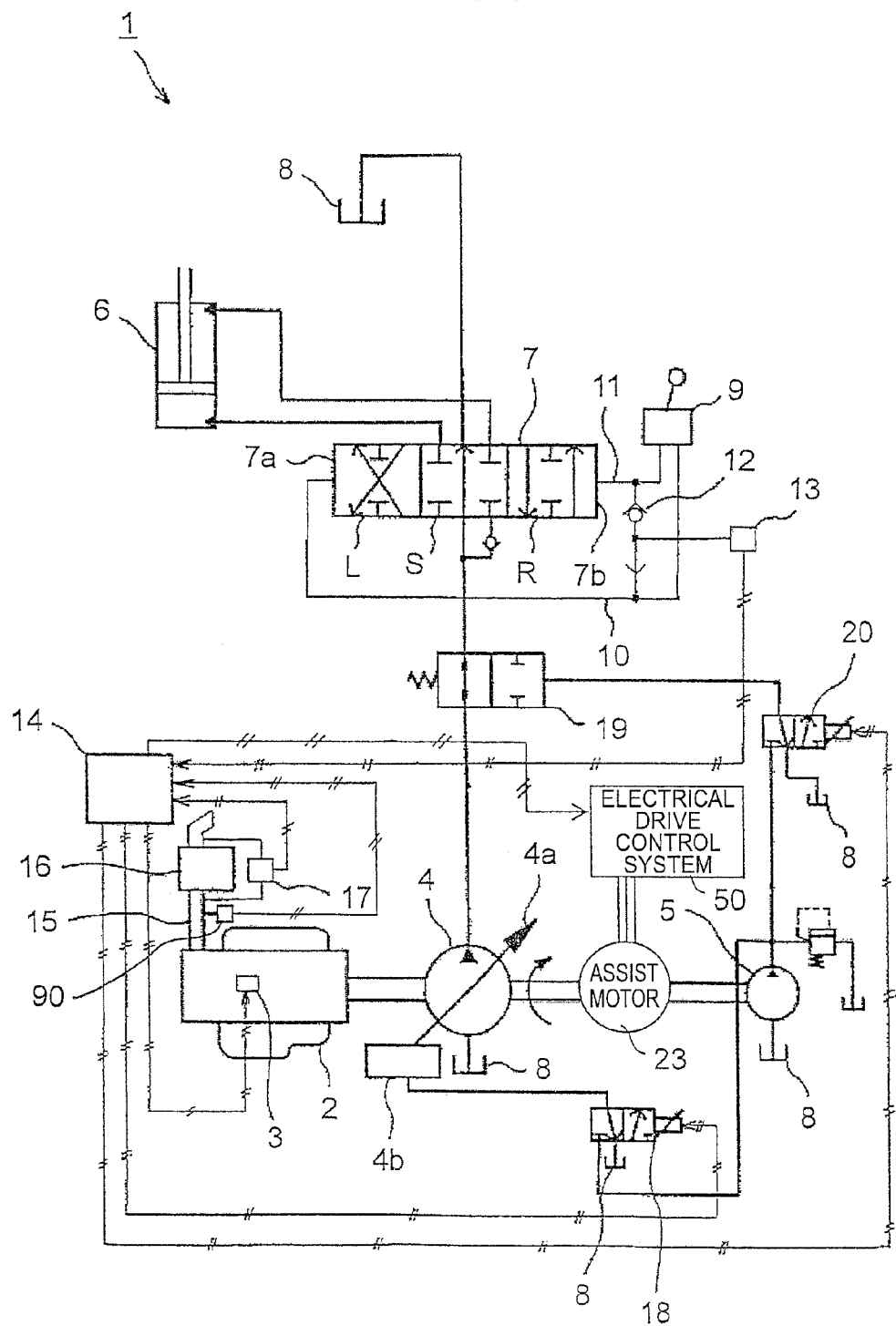
FIG. 8 is an electro hydraulic circuit diagram illustrating a second embodiment of the hydraulic drive system according to the present invention.
Figure 9:
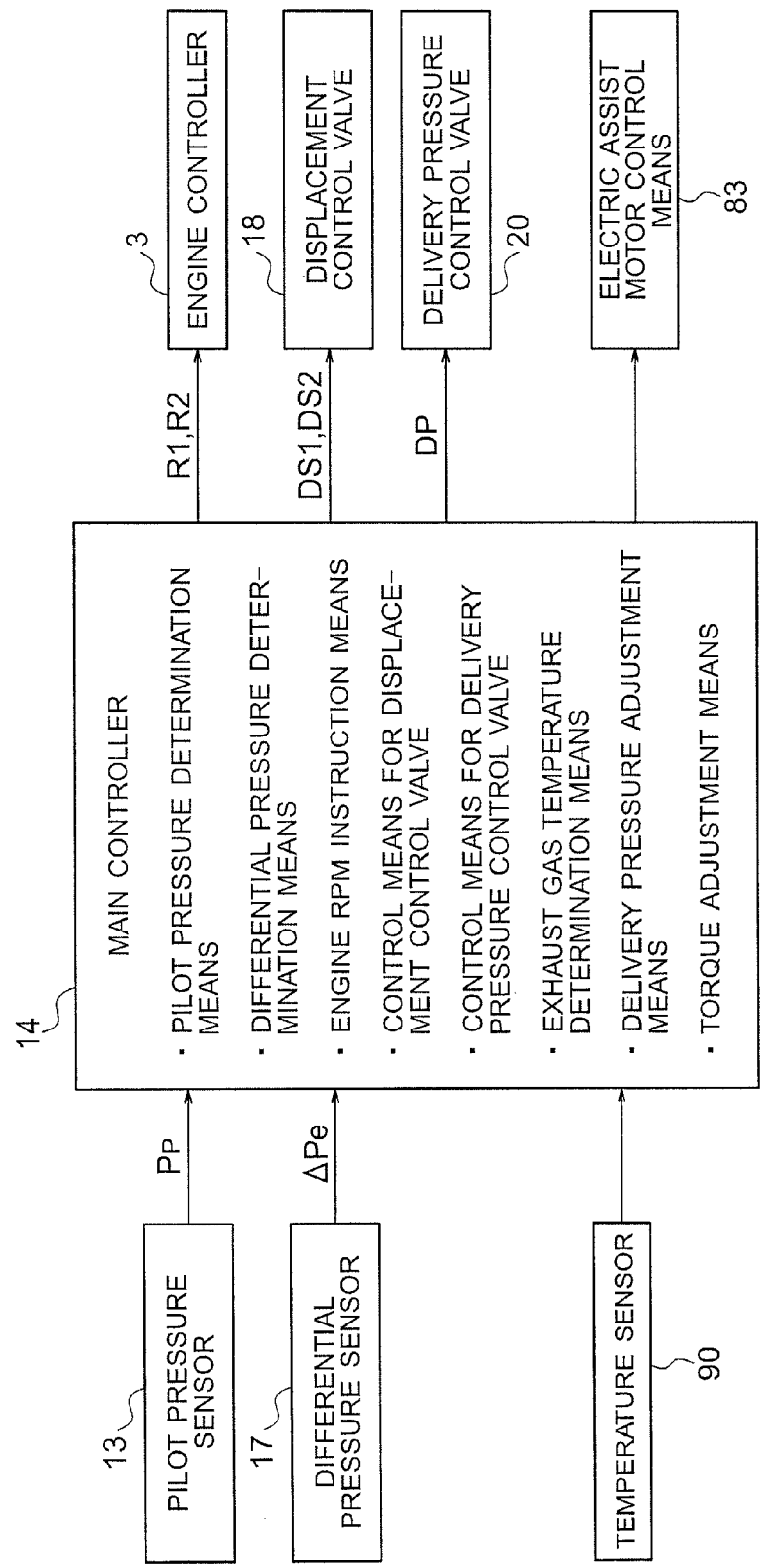
FIG. 9 is a block diagram depicting a hydraulic control system, which is arranged in the second embodiment and includes a main controller.
Figure 10:
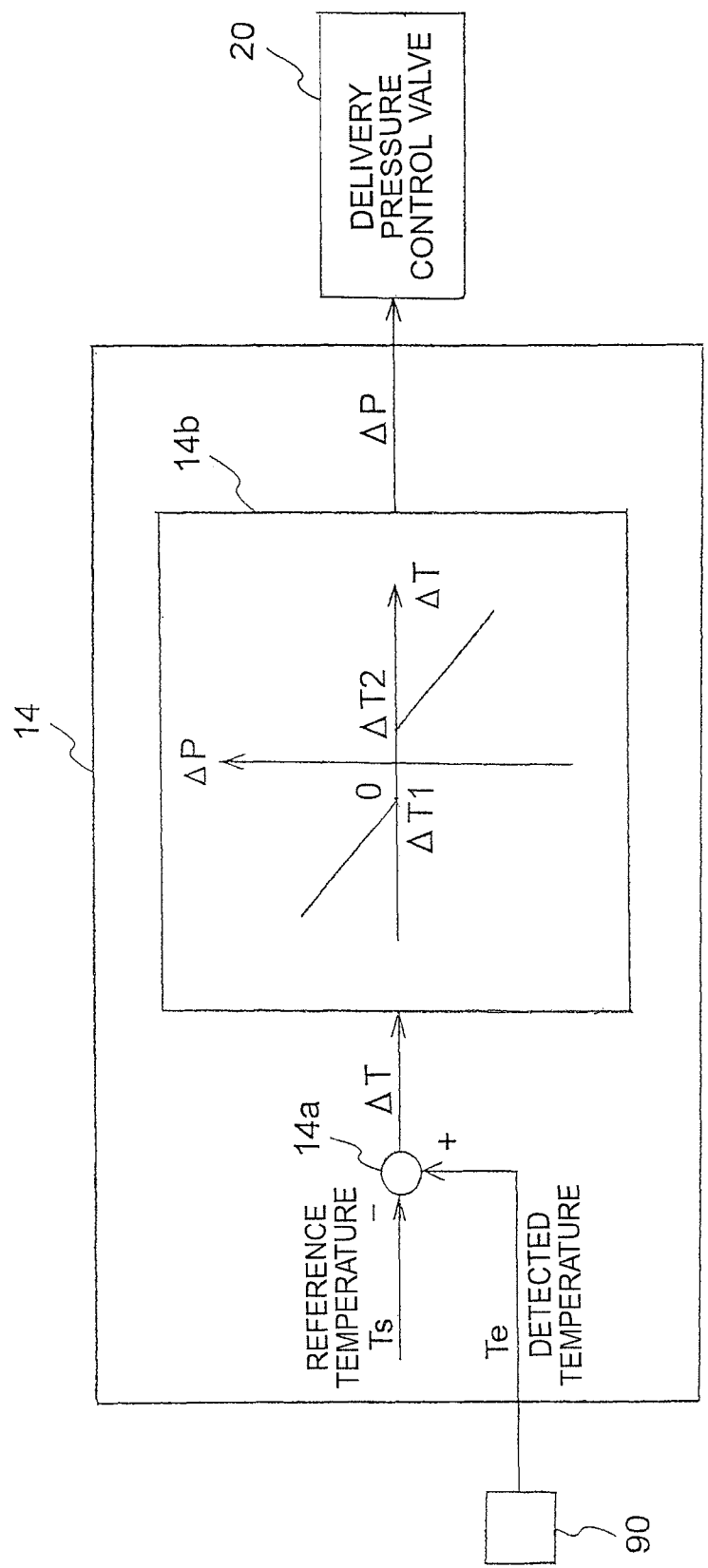
FIG. 10 is a diagram showing a construction for adjusting actuation of a hydraulic load application means, which is arranged in the second embodiment and is included in the main controller.
Figure 11:
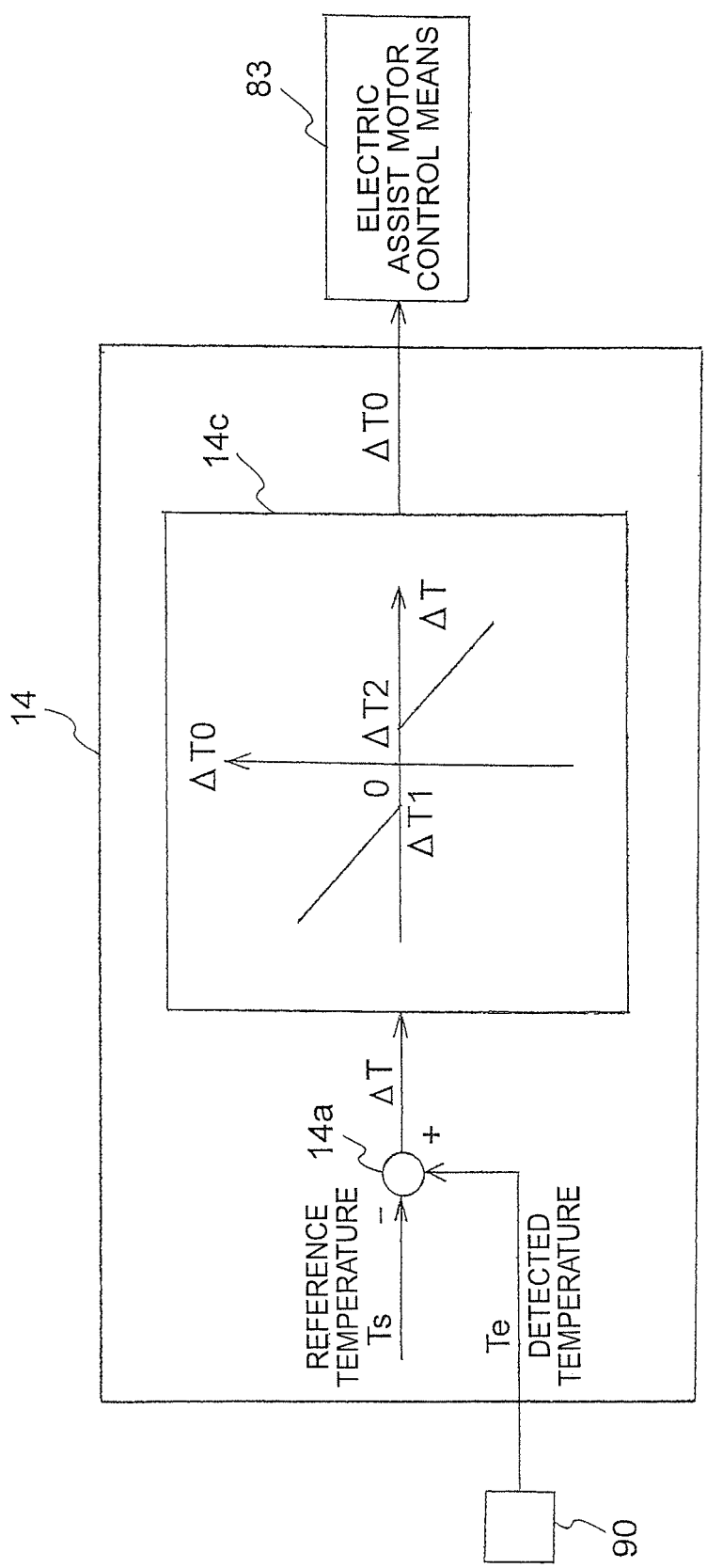
FIG. 11 is a flow chart showing a control processing routine in the main controller arranged in the second embodiment upon applying a hydraulic load.
Figure 12:
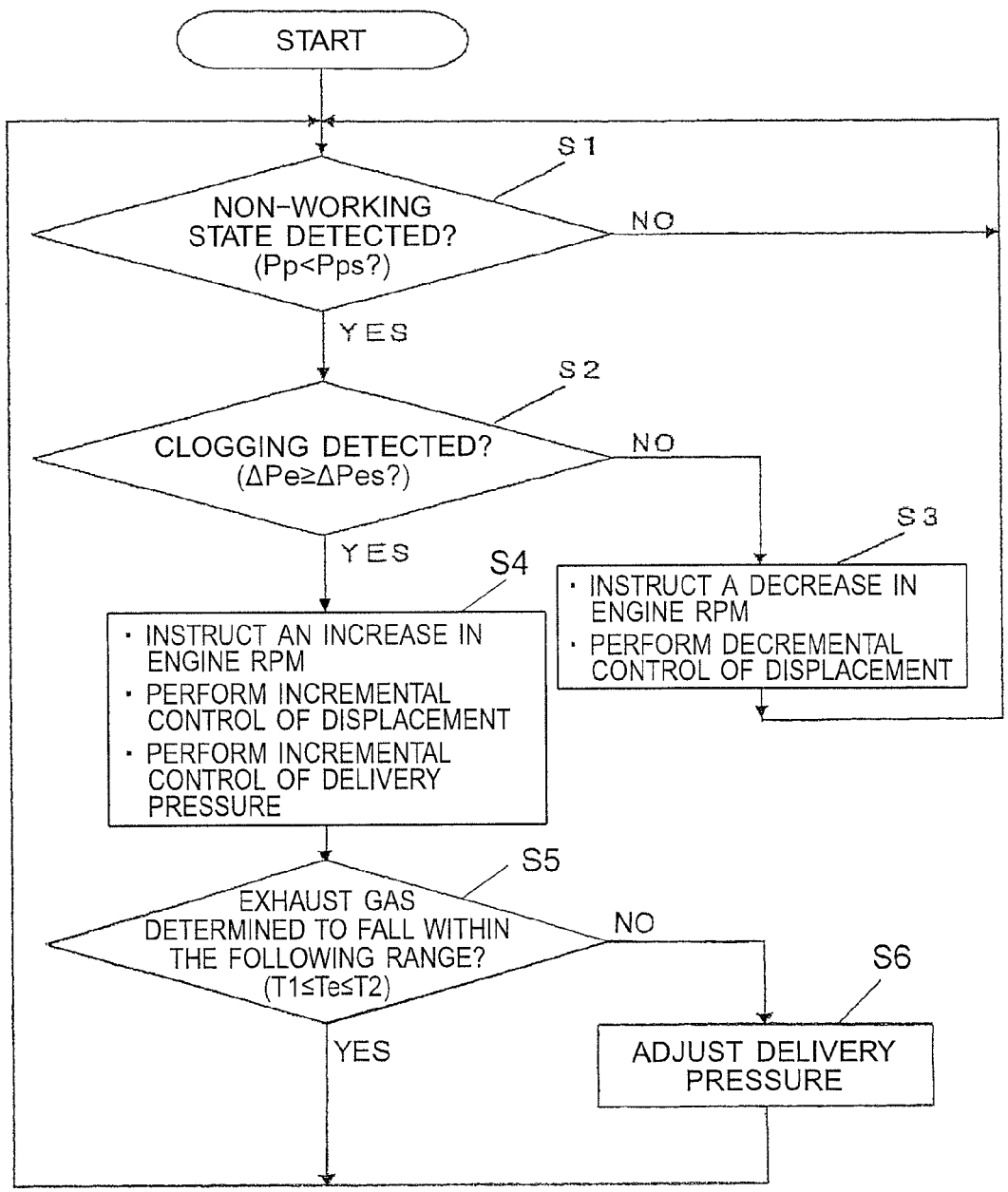
FIG. 12 is a diagram showing a construction for adjusting actuation of an electric load application means, which is arranged in the second embodiment and is included in the main controller.

FIG. 7 is a diagram illustrating a relationship between an electric load and a hydraulic load relative to capacitor voltage upon actuating both of an electric load application means and hydraulic load application means arranged in the first embodiment.

Because this embodiment is configured to enable the control processing, which actuates the hydraulic load application means, and the control processing, which actuates the electric load application means, independently of each other, the total of a load by a hydraulic load application in the control processing to actuate the hydraulic load application means and a load by an electric load application in the control processing to actuate the electric load application means is set to be the same as such a load on the engine 2 that gives an exhaust gas temperature at which particulate matter is burnt.

As illustrated in FIG. 7, this embodiment is also configured to change, depending on a capacitor voltage, the rates of a hydraulic load and an electric load in a load to the engine 2 as required for a load application. Around the lower limit threshold value VL at which the capacitor voltage is low, the rate of an electric load application is set large. Around the higher limit threshold value VH at which the capacitor voltage is high, on the other hand, the rate of a hydraulic load application is set large. In this manner, the electric load application of good efficiency can be positively used, and moreover, the switching among the hydraulic load application alone, the electric load application and the combined use of the hydraulic and electric load applications can be stably performed according to fluctuations in the capacitor voltage.

It is to be noted that, when the combined use of an electric load application and a hydraulic load application is not performed in an intermediate capacitor voltage range unlike this embodiment, the capacitor 24 is charged by an electric load application alone, and, at the moment that the voltage has exceeded a certain threshold value, the electric load application by the electric assist motor 23 is stopped, the variable restrictor 19 that raises a pump delivery pressure is closed, and the electric load application is switched to a hydraulic load application. Here, there is a potential concern that due to a difference in switching response or the like between the electrical and hydraulic load applications, a sudden load fluctuation may occur on the engine 2 to produce a shock.

As has been described above, the load application means for applying a load to the engine 2 in this embodiment is comprised of the electric load application means, which applies a load to the engine 2 to raise the temperature of exhaust gas by operating the electric assist motor 23 to generate electric power, and the hydraulic load application means, which applies a load to the engine 2 to raise the temperature of exhaust gas by raising the delivery pressure of the variable displacement hydraulic pump. When the electrical drive control system 50, which includes the electric assist motor 23 and the capacitor 24 as an electrical storage device, is normally operating, the control processing that actuates the electric load application means is hence selected by the selection control means. As a consequence, the particulate matter accumulated in the exhaust gas purification system 16 can be burnt at high accuracy. When the electric load application means is actuated as described above but an abnormality occurs in the electrical drive control system 50 including the electric assist motor 23 and capacitor 24 and the electric load application means fails to function any longer, it is only necessary to select, by the selection control means, the control processing that actuates the hydraulic load application means. As a result, a more energy loss or the like occurs than the actuation of the electric load application means, but the particulate matter accumulated in the exhaust gas purification system 16 can be burnt. In other words, even at the time of a failure of the electrical drive control system 50 provided with the electric load application means and including the electric assist motor 23 and capacitor 24, the particulate matter trapped in the filter of the exhaust gas purification system 16 can be burnt. As a consequence, the function to eliminate particulate matter in exhaust gas as accumulated in the exhaust gas purification system 16 can be improved, thereby making it possible to obtain a hydraulic excavator excellent in the accuracy of purification of exhaust gas from the engine 2.

LEGEND

1 Hydraulic drive system
2 Engine
4 Variable displacement hydraulic pump
6 Hydraulic actuator
7 Actuator control valve 8 Hydraulic oil reservoir
9 Control device
13 Pilot pressure sensor
14 Controller
15 Exhaust pipe
16 Exhaust gas purification system
17 Pressure sensor
18 Displacement control valve
19 Variable restrictor
20 Delivery pressure control valve
23 Electric assist motor
24 Capacitor
30 Travel base
31 Upperstructure
32 Working equipment
50 Electrical drive control system
53 Inverter
55 Power control unit
80 Controller
81 Abnormality monitoring means
82 Storage state monitoring means
83 Electric assist motor control means

The invention claimed is:

1. A working machine, comprising:
an engine,
a variable displacement hydraulic pump drivable by the engine,
an electric assist motor for assisting the engine in driving the variable displacement hydraulic pump or generating electric power,
an exhaust gas purification system for trapping, by a filter, particulate matter in exhaust gas produced from the engine,
an actuator control valve that is interposed between the variable displacement hydraulic pump and a hydraulic actuator and that is switchable to one of a feed state in which hydraulic oil from the variable displacement hydraulic pump is to be fed to the hydraulic actuator and a non-feed state in which the hydraulic oil is returned to a hydraulic oil reservoir without feeding the hydraulic oil to the hydraulic actuator,
an electrical storage device connected to the electrical assist motor, and
a load application circuit that is configured to apply a load to the engine such that a temperature of the exhaust gas is raised to a temperature required to burn the particulate matter, wherein:
the load application circuit comprises an electric load application circuit that is configured to apply the load to the engine to raise the temperature of the exhaust gas by operating the electric assist motor to generate electric power, and a hydraulic load application circuit that is configured to apply the load to the engine to raise the temperature of the exhaust gas by increasing a delivery pressure of the variable displacement hydraulic pump,
the working machine is further provided with a controller that is configured to selectively actuate the electric load application circuit and/or the hydraulic load application circuit,
the controller comprises an abnormality monitoring software that is configured to monitor an abnormality of an electrical drive control system including the electric assist motor and electrical storage device, and, when the abnormality is monitored by the abnormality monitoring software, performs control processing to actuate the hydraulic load application circuit,
the controller comprises a storage state monitoring software that is configured to monitor a storage state of the electrical storage device, and according to the storage state monitored by the storage state monitoring software, performs one of control processing that actuates the hydraulic load application circuit alone, control processing that actuates the electric load application circuit alone, and control processing that actuates both of the hydraulic load application circuit and the electric load application circuit, and
upon application of the load to the engine, the controller performs the control processing, in which the hydraulic load application circuit alone is actuated, when a remaining storage level of the electrical storage device as monitored by the storage state monitoring software is lower than a preset lower limit threshold value, the control processing, in which the electric load application circuit alone is actuated, when the remaining storage level of the electrical storage device is higher than a preset higher limit threshold value, or the control processing, in which both of the hydraulic load application circuit and the electric load application circuit are actuated, when the remaining storage level of the electrical storage device is between the higher limit threshold value and the lower limit threshold value.

2. The working machine according to claim 1, wherein, upon the control processing in which both of the hydraulic load application circuit and the electric load application circuit are actuated, the controller performs, according to a storage voltage of the electrical storage device, control processing that changes actuation rates of the hydraulic load application circuit and the electric load application circuit.

3. The working machine according to claim 2, wherein, upon the control processing in which both of the hydraulic load application circuit and electric load application circuit are actuated, the controller performs control processing that increases the application rate of the electric load application circuit when the storage voltage of the electrical storage device is around the lower limit threshold value but increases the application rate of the hydraulic load application circuit when the storage voltage of the electrical storage device is around the higher limit threshold value.

* * * * *